United States Patent [19]

Yokote et al.

[11] Patent Number: 5,153,249

[45] Date of Patent: Oct. 6, 1992

[54] POLYPROPYLENE RESIN COMPOSITIONS

[75] Inventors: Sachio Yokote; Yoichi Kawai; Masaki Misumi, all of Kanagawa, Japan

[73] Assignee: Mitsui Toatsu Chemicals, Inc., Tokyo, Japan

[21] Appl. No.: 519,648

[22] Filed: May 7, 1990

[30] Foreign Application Priority Data

May 11, 1989 [JP] Japan .................................. 1-116140

[51] Int. Cl.⁵ ............................................... C08K 5/15
[52] U.S. Cl. .................................... 524/108; 524/451
[58] Field of Search ....................... 524/372, 451, 108

[56] References Cited

U.S. PATENT DOCUMENTS

| 4,314,039 | 2/1982 | Kawai et al. | 524/108 |
| 4,397,916 | 8/1983 | Nagana | 428/462 |
| 4,410,582 | 10/1983 | Tsunashima et al. | 428/323 |
| 4,594,376 | 6/1986 | Hamada et al. | 524/101 |
| 4,611,024 | 9/1986 | Wolfe . | |
| 4,902,553 | 2/1990 | Hwang et al. | 428/156 |

FOREIGN PATENT DOCUMENTS

11485/88 8/1988 Australia .
0137482 4/1985 European Pat. Off. .
0278470 8/1988 European Pat. Off. .

OTHER PUBLICATIONS

Chemical Abstracts, vol. 108, No. 2, Jan. 11, 1988, Columbus, Ohio U.S.A., p. 35, ref. no. 6962K; & JP-A-62 115 049.

Primary Examiner—John C. Bleutge
Assistant Examiner—Mark Sweet
Attorney, Agent, or Firm—Burns, Doane, Swecker & Mathis

[57] ABSTRACT

A polypropylene resin composition comprising 100 parts by weight of a polypropylene resin, 0.01 to 1.0 part by weight of 1·3, 2·4-di-benzylidene sorbitol and 0.005 to 1.0 part by weight of talc. The components of the polypropylene resin composition are not guided and do not escape from the composition even when it is immersed in hot water. The composition is excellent in transparency and products obtained by blow molding of the composition are also excellent in transparency.

5 Claims, No Drawings

POLYPROPYLENE RESIN COMPOSITIONS

BACKGROUND OF THE INVENTION

1. Field of the Invention

The present invention relates to a polypropylene resin composition from which a sorbitol derivative added thereto is not extracted or does not escape from the resin composition in hot water and which is excellent in transparency and more specifically to a polypropylene resin composition which can provide molded products excellent in transparency through blow molding.

2. Description of the Related Art

Polypropylene resins have widely been used in various fields, for instance, in foods (for instance, as materials for the production of packages for foods; containers for frozen dessert, for fast foods and for margarine; and trays); and in medical machinery and tools (for instance, as materials for the production of syringes for injectors, spitz tubes, containers for infusion solutions and cylinders) since they are excellent in mechanical properties, heat resistance and resistance to chemicals.

However, they do not exhibit satisfactory transparency. It is very important for materials used in such fields as containers for foods and medical machinery and tools that the presence or absence of impurities or foreign substances such as refuse or the like in the contents of a container can be externally confirmed and it is not desirable that the color tint of the contents be changed when it is observed through the container. For this reason, it is desired to use a polypropylene resin excellent in transparency, in these fields.

There has widely been used a method for improving the transparency of polypropylene resins which comprises incorporating a sorbitol derivative into the resins.

However, when a polypropylene resin composition obtained by incorporating such a sorbitol derivative into a polypropylene resin is immersed in hot water for the purpose of sterilization or the like, the sorbitol derivative is extracted or escapes from the resin composition and is dissolved in the hot water and after the hot water is cooled, the derivative forms suspended matter in the water. This necessarily becomes a cause of problems of safety and hygiene.

Examples of sorbitol derivatives which can improve the transparency of polypropylene resins include 1·3, 2·4-di-benzylidene sorbitol, 1·3, 2·4-di-(methylbenzylidene)sorbitol and 1·3, 2·4-di-(ethylbenzylidene)sorbitol.

Polypropylene resin compositions to which 1·3, 2·4-di-(methylbenzylidene) sorbitol or 1·3, 2·4-di-(ethylbenzylidene)sorbitol is added among others are excellent in transparency, but generate a large quantity of suspended matter when they are immersed in hot water and, therefore, a problem of safety and hygiene arises.

On the other hand, when polypropylene resin compositions to which 1·3, 2·4-di-benzylidene sorbitol is added are immersed in hot water, suspended matter is formed in a relatively small amount in the hot water, but the problem of safety and hygiene is not yet solved completely and the transparency thereof is still insufficient. Thus, any compositions which simultaneously satisfy the foregoing two requirements, i.e., compositions excellent in transparency and free of suspended matter when they are immersed in hot water have not yet been proposed.

Moreover, some polypropylene compositions improved in transparency by the addition of sorbitol derivatives have been proposed, but if they are subjected to blow molding to form molded products, the transparency of the products is impaired.

SUMMARY OF THE INVENTION

Accordingly, an object of the present invention is to provide a polypropylene resin composition from which a sorbitol derivative added thereto is not extracted or does not escape when the composition is immersed in hot water and which is excellent in transparency.

Another object of the present invention is to provide a polypropylene resin composition which makes it possible to provide molded products maintaining excellent transparency even after blow molding.

The inventors of this invention have conducted various studies to eliminate the foregoing drawbacks associated with a polypropylene resin composition to which a sorbitol derivative is added, have found that the drawbacks can effectively be eliminated by adding talc to a composition comprising a polypropylene resin and 1·3, 2·4-di-benzylidene sorbitol and thus have completed the present invention.

Consequently, according to the present invention, there is provided a polypropylene resin composition which comprises 100 parts by weight of a polypropylene resin, 0.01 to 1.0 part by weight of 1·3, 2·4-di-benzylidene sorbitol and 0.005 to 1.0 part by weight of talc.

As has been described above, it is known that transparency of polypropylene resins can be improved by the addition of 1·3, 2·4-di-benzylidene sorbitol thereto and it is likewise known that crystallizability of polypropylene resins can be enhanced by the addition of talc thereto.

However, if talc is separately added to polypropylene resins, the transparency thereof is not improved and is rather impaired.

Unexpectedly, the inventors of this invention have found that the transparency of polypropylene resins is markedly increased by the simultaneous addition of talc and 1·3, 2·4-di-benzylidene sorbitol.

Surprisingly, the inventors have further found that the transparency of molded products obtained through blow molding can be substantially increased by the simultaneous use of talc and 1·3, 2·4-di-benzylidene sorbitol. Such an improvement in transparency of products molded by blow molding has conventionally seemed to be impracticable.

Furthermore, contrary to expectations, the generation of suspended matters observed when a polypropylene resin composition is immersed in hot water can be suppressed by the simultaneous use of talc and 1·3, 2·4-di-benzylidene sorbitol.

Such an idea of simultaneous use thereof cannot be derived on the basis of any conventional knowledge.

DESCRIPTION OF THE PREFERRED EMBODIMENTS

The polypropylene resins used in the present invention may be propylene homopolymers, propylene-ethylene copolymers, propylene-α-olefin copolymers or mixtures thereof. Particularly preferred polypropylene resins which provide the optimum effect of the present invention are propylene-ethylene random copolymers whose ethylene content ranges from 2 to 6% by weight.

In the present invention, 1·3, 2·4-di-benzylidene sorbitol is used in an amount ranging from 0.01 to 1.0 part by weight, preferably 0.02 to 0.5 part by weight per 100 parts by weight of a polypropylene resin used. This is because, if it is added in an amount less than 0.01 part by weight, the transparency of the resulting molded product is not improved at all, while if the amount thereof exceeds 1.0 part by weight, any further improvement in the effect is not expected since it is not increased in proportion to the added amount. Moreover, it is severely extracted from the composition and deposited onto the inner surface of a mold during molding, which becomes a cause of various troubles.

The average particle size of talc used in the present invention is not critical, but is preferably not more than 50 μm. The amount of talc to be added to the composition ranges from 0.005 to 1.0 part by weight and preferably 0.01 to 0.1 part by weight per 100 parts by weight of a polypropylene resin used. This is because, if it is used in an amount less than 0.005, the transparency of the resulting molded product is not improved at all, while if the amount thereof exceeds 1.0 part by weight, the transparency thereof is conversely lowered.

In the polypropylene resin composition according to the present invention, 1·3, 2·4-di-benzylidene sorbitol and talc each can be used in an amount defined above, but the amount of talc added is preferably controlled to a range of from 5 to 60% by weight with respect to that of 1·3, 2·4-di-benzylidene sorbitol to achieve higher transparency of the resulting molded products.

The polypropylene resin composition of the present invention may optionally comprise other additives such as antioxidants, ultraviolet absorbers, pigments, dispersants and neutralizing agents.

Examples of antioxidants which can be used in the invention are tris(2,4-di-butylphenyl)phosphite, 2,6-di-t-butyl-p-methylphenol, n-octadecyl-3-(4-hydroxy-3,5-di-butylphenyl) propionate, tetrakis [methylene-3-(3,5-di-t-butyl-4-hydroxyphenyl) propionate]methane, pentaerythritol-tetrakis-(β-lauryl-thiopropionate) and dilauryl thiopropionate.

Typical examples of UV absorbers include 2-hydroxy-4-n-octoxy-benzophenone, 2-(2-hydroxy-3,5-di-butyl-phenyl)-5-chlorobenzene triazole, dimethyl succinate ·2-(4-hydroxy-2,2,6 6-tetramethyl-1-piperidyl-)ethanol condensate.

In addition, a peroxide may be added to the composition to control the melt flow index thereof for the purpose of improving moldability of the resin composition of the present invention.

Typical examples of such peroxides are 2,5-dimethyl-2,5-bis(t-butylperoxy) hexane, di-t-butyl perphthalate and benzoyl peroxide.

The polypropylene resin composition of the present invention may be prepared by a method which comprises mixing and kneading a polypropylene resin, 1·3, 2·4-di-benzylidene sorbitol and talc as well as known additives, for instance, neutralizing agents such as calcium stearate, antioxidants, UV absorbers and peroxides in a blender such as a Henschel mixer to uniformly disperse these ingredients and then pelletizing by extruding the melt thereof through an extruder.

The polypropylene resin composition of the present invention will hereinafter be explained in more detail with reference to the following non-limiting working Examples and the effects practically achieved by the invention will also be discussed in detail in connection with Comparative Examples.

EXAMPLE 1

To 100 parts by weight of a propylene-ethylene random copolymer (melt flow index determined at 230° C. and a load of 2.16 kg:8 g/10 min; ethylene content: 4.0% by weight) powder, there were added 0.3 part by weight of 1·3, 2·4-di-benzylidene sorbitol, 0.05 part by weight of talc having an average particle size of 1.0μm (available from ASADA Flour Milling Co., Ltd under the trade name of MMR), 0.1 part by weight of calcium stearate, 0.1 part by weight of tris(2,4-di-t-butylphenyl) phosphite as an antioxidant and 0.04 part by weight of dimethyl succinate ·2-(4-hydroxy-2,2,6,6-tetramethyl-1-piperidyl)ethanol condensate as a UV absorber. These ingredients were mixed and kneaded in a Henschel mixer and then pelletized with a conventional extruder at about 240 ° C.

The pellets thus obtained (30 g) were immersed in 300 cc of pure water in an autoclave. The pellets were maintained in water at 121° C. for 3 hours, the resulting extract was withdrawn from the autoclave, filtered to remove the pellets. After the filtrate was maintained at ordinary temperature for 24 hours, it was inspected to determine whether suspended matter was present.

The presence of suspended matter (or resistance to hot water extraction) was examined by macroscopic observation or visual inspection and estimated according to the following four-stage evaluation standard:

○: no suspended matter was observed
Δ: a very small amount Of suspended matter was observed
X: suspended matter was observed to some extent
X X a large quantity of suspended matter was observed The pellets were molded into a plate having a size of 60×80×2 mm by injection molding at 210° C. with an injection molder and the haze of the resulting plate was determined with a hazemeter. The results thus obtained are summarized in the following Table-1.

EXAMPLE 2

The same procedures used in Example 1 were repeated except that talc was used in an amount of 0.1 part by weight to obtain pellets and the same evaluation as that in Example 1 was performed. The results obtained are listed in Table-1.

EXAMPLE 3

The same procedures used in Example 1 were repeated except that talc was used in an amount of 0.15 part by weight to obtain pellets and the same evaluation as that in Example 1 was performed. The results obtained are listed in Table-1.

COMPARATIVE EXAMPLE 1

The same procedures used in Example 1 were repeated except that talc was not used at all to obtain pellets and the same evaluation as that in Example 1 was performed. The results obtained are listed in Table-1.

The transparency of the resulting molded product was inferior to that observed on the molded product according to the present invention and the resistance to hot water extraction of the pellets of Comparative Example was also inferior to that for the present invention.

COMPARATIVE EXAMPLE 2

The same procedures used in Example 2 were repeated except that 1·3, 2·4-di-benzylidene sorbitol was not used at all to obtain pellets and a plate and the same evaluation as that in Example 2 was performed. The results obtained are listed in Table-1.

The transparency of the molded product of Comparative Example 2 was inferior to that of the product of the present invention.

COMPARATIVE EXAMPLE 3

The same procedures used in Example 2 were repeated except that 1·. ene sorbitol was used in an amount of 0.005 part by weight to obtain pellets and a plate and the same evaluation as that in Example 2 was performed. The results obtained are listed in Table-1.

The transparency of the molded product of Comparative Example 3 was inferior to that of the product of the present invention.

COMPARATIVE EXAMPLE 4

The same procedures used in Example 2 were repeated except that 1·3, 2·4-di-benzylidene sorbitol was used in an amount of 1.5 part by weight to obtain pellets and a plate and the same evaluation as that in Example 2 was performed. The results obtained are listed in Table-1.

The transparency of the resulting molded product was inferior to that observed on the product according to the present invention and the resistance to hot water extraction of the pellets of this Comparative Example was also inferior to that for the present invention.

A large quantity of white powder was exuded from the pellets obtained and deposited onto the inner surface of the mold during injection molding.

COMPARATIVE EXAMPLE 5

The same procedures used in Example 1 were repeated except that talc was used in an amount of 0.001 part by weight to obtain pellets and a plate and the same evaluation as that in Example 1 was performed. The results obtained are listed in Table-1.

The transparency of the resulting molded product was inferior to that observed on the product according to the present invention and the resistance to hot water extraction of the pellets of this Comparative Example was also inferior to that for the present invention.

COMPARATIVE EXAMPLE 6

The same procedures used in Example 1 were repeated except that talc was used in an amount of 1.5 part by weight to obtain pellets and a plate and the same evaluation as that in Example 1 was performed. The results obtained are listed in Table-1.

The transparency of the molded product of Comparative Example 6 was inferior to that of the product of the present invention.

COMPARATIVE EXAMPLE 7

The same procedures used in Example 1 were repeated except that talc and 1·3, 2·4-di-benzylidene sorbitol were not used at all to obtain pellets and a molded plate and the same evaluation as that in Example 1 was performed. The results obtained are listed in Table-1.

The transparency of the molded product of Comparative Example 7 was inferior to that of the product of the present invention.

COMPARATIVE EXAMPLE 8

The same procedures used in Example 1 were repeated except that talc was not used at all and that 0.3 part by weight of 1·3, 2·4-di-(methylbenzylidene) sorbitol was substituted for 1·3, 2·4-di-benzylidene sorbitol used in Example 1 to obtain pellets and a plate and the same evaluation as that in Example 1 was performed. The results obtained are listed in Table-1.

The resistance to hot water extraction of the pellets of this Comparative Example was also inferior to that for the present invention.

COMPARATIVE EXAMPLE 9

The same procedures used in Example 2 were repeated except that 0.3 part by weight of 1·3, 2·4-di-(methylbenzylidene) sorbitol was substituted for 1·3, 2·4-di-benzylidene sorbitol used in Example 2 to obtain pellets and a plate and the same evaluation as that in Example 2 was performed. The results obtained are listed in Table-1.

The transparency of the resulting molded product was inferior to that observed on the product according to the present invention and the resistance to hot water extraction of the pellets of this Comparative Example was also inferior to that for the present invention.

TABLE 1

| | Composition (part by weight) | | | | Results of evaluation | | |
|---|---|---|---|---|---|---|---|
| | PP | 1·3, 2·4-Di-benzylidene sorbitol | 1·3, 2·4-Di-(methyl-benzylidene) sorbitol | Talc | Haze (%) | Resistance to hot water extraction | Remark |
| Example | | | | | | | |
| 1 | 100 | 0.3 | | 0.05 | 13 | ○ | |
| 2 | 100 | 0.3 | | 0.1 | 12 | ○ | |
| 3 | 100 | 0.3 | | 0.15 | 13 | ○ | |
| Comparative Example | | | | | | | |
| 1 | 100 | 0.3 | | | 25 | △~X | |
| 2 | 100 | | | 0.1 | 68 | ○ | |
| 3 | 100 | 0.005 | | 0.1 | 60 | ○ | |
| 4 | 100 | 1.5 | | 0.1 | 35 | X | A large quantity of deposits on the inner wall of a mold during molding |
| 5 | 100 | 0.3 | | 0.001 | 25 | △ | |
| 6 | 100 | 0.3 | | 1.5 | 66 | ○ | |
| 7 | 100 | | | | 70 | ○ | |
| 8 | 100 | | 0.3 | | 12 | XX | |
| 9 | 100 | | 0.3 | 0.1 | 18 | XX | |

EXAMPLE 4

To 100 parts by weight of propylene-ethylene random copolymer (melt flow index determined at 230° C. and a load of 2.16 kg:1.5 g/10 min; ethylene content: 4.0% by weight) powder, there were added 0.3 part by weight of 1.3, 2.4-di-benzylidene sorbitol, 0.05 part by weight of talc having an average particle size of 1.0 μm (available from ASADA Flour Milling Co., Ltd under the trade name of MMR), 0.1 part by weight of calcium stearate, 0.1 part by weight of tris(2,4-di-t-butylphenyl) phosphite as an antioxidant and 0.04 part by weight of dimethyl nate -2-(4-hydroxy-2,2,6,6-tetramethyl-1-piperidyl)ethanol condensate as a UV absorber. These ingredients were mixed and kneaded in a Henschel mixer and then pelletized with a conventional extruder at about 240° C.

The pellets were molded into a bottle having an average thickness of about 1.0 mm and an inner volume of 750 cc by blow molding at 200° C. with a blow molder and transparency of the resulting bottle was determined. The transparency was estimated by reading the numerical values on the universal eyesight test chart (for a distance of 3 m) through the bottle and the smallest numeral which can be read correctly is defined as the measure for transparency. The results thus obtained are summarized in the following Table-2.

EXAMPLE 5

The same procedures used in Example 4 were repeated except that talc was used in an amount of 0.1 part by weight to obtain pellets and a bottle and the same evaluation used in Example 4 was performed. The results thus obtained are listed in Table-2.

EXAMPLE 6

The same procedures used in Example 4 were repeated except that talc was used in an amount of 0.15 part by weight to obtain pellets and a bottle and the same evaluation used in Example 4 was performed. The results thus obtained are listed in Table-2.

COMPARATIVE EXAMPLE 10

The same procedures used in Example 4 were repeated except that talc was not used at all to obtain pellets and a bottle and the same evaluation used in Example 4 was performed. The results thus obtained are listed in Table-2.

The transparency of the resulting molded product was inferior to that observed on the product obtained through blow molding of the composition of the present invention.

COMPARATIVE EXAMPLE 11

The same procedures used in Example 5 were repeated except that 1·3, 2·4-di-benzylidene sorbitol was not used at all to obtain pellets and a bottle and the same evaluation used in Example 5 was performed. The results thus obtained are listed in Table-2.

The transparency of the resulting molded product was inferior to that observed on the product obtained through blow molding of the composition of the present invention.

COMPARATIVE EXAMPLE 12

The same procedures used in Example 5 were repeated except that 1·3, 2·4-di-benzylidene sorbitol was used in an amount of 0.005 part by weight to obtain pellets and a bottle and the same evaluation used in Example 5 was performed. The results thus obtained are listed in Table-2.

The transparency of the resulting molded product was inferior to that observed on the product obtained through blow molding of the composition of the present invention.

COMPARATIVE EXAMPLE 13

The same procedures used in Example 4 were repeated except that talc was used in an amount of 0.001 part by weight to obtain pellets and a bottle and the same evaluation used in Example 4 was performed. The results thus obtained are listed in Table-2.

The transparency of the resulting molded product was inferior to that observed on the product obtained through blow molding of the composition of the present invention.

COMPARATIVE EXAMPLE 14

The same procedures used in Example 4 were repeated except that talc was used in an amount of 1.5 part by weight to obtain pellets and a bottle and the same evaluation used in Example 4 was performed. The results thus obtained are listed in Table-2.

The transparency of the resulting molded product was inferior to that observed on the product obtained through blow molding of the composition of the present invention.

COMPARATIVE EXAMPLE 15

The same procedures used in Example 4 were repeated except that 1·3, 2·4-di-benzylidene sorbitol and talc were not used at all to obtain pellets and a bottle and the same evaluation used in Example 4 was performed. The results thus obtained are listed in Table-2.

The transparency of the resulting molded product was inferior to that observed on the product obtained through blow molding of the composition of the present invention.

COMPARATIVE EXAMPLE 16

The same procedures used in Example 4 were repeated except that 0.3 part by weight of 1·3, 2·4-di-(methylbenzylidene) sorbitol was substituted for 1·3, 2·4-di-benzylidene sorbitol used in Example 4 and that talc was not used at all to obtain pellets and a bottle and the same evaluation used in Example 4 was performed. The results thus obtained are listed in Table-2.

The transparency of the resulting molded product was inferior to that observed on the product obtained through blow molding of the composition of the present invention.

TABLE 2

| | | Composition (part by weight) | | | Results of evaluation |
|---|---|---|---|---|---|
| | PP | 1·3, 2·4-Di-benzylidene sorbitol | 1·3, 2·4-Di-(methyl-benzylidene) sorbitol | Talc | Numeral read on universal eyesight test chart (for a distance of 3m) |
| Example | | | | | |

TABLE 2-continued

| | Composition (part by weight) | | | | Results of evaluation Numeral read on universal eyesight test chart (for a distance of 3m) |
|---|---|---|---|---|---|
| | PP | 1-3, 2-4-Di-benzylidene sorbitol | 1-3, 2-4-Di-(methyl-benzylidene) sorbitol | Talc | |
| 4 | 100 | 0.3 | | 0.05 | 1.5 |
| 5 | 100 | 0.3 | | 0.1 | 1.5 |
| 6 | 100 | 0.3 | | 0.15 | 1.5 |
| Comparative Example | | | | | |
| 10 | 100 | 0.3 | | | 0.7 |
| 11 | 100 | | | 0.1 | 0.2 |
| 12 | 100 | 0.005 | | 0.1 | 0.2 |
| 13 | 100 | 0.3 | | 0.001 | 0.8 |
| 14 | 100 | 0.3 | | 1.5 | 0.5 |
| 15 | 100 | | | | 0.1 |
| 16 | 100 | | 0.3 | | 1.0 |

As has been described above in detail, the polypropylene resin composition according to the present invention does not cause exudation of the sorbitol derivative as a component thereof in hot water and is excellent in transparency. Moreover, the products obtained by blow molding of the composition is also excellent in transparency. Therefore, the composition can be used for various uses such as a material for medical machinery and tools and packages for foods or the like without causing any problem of safety and hygiene.

What is claimed is:

1. A transparent polypropylene resin composition comprising 100 parts by weight of a propylene-ethylene random copolymer which has an ethylene content ranging from 2 to 6% by weight, 0.01 to 1.0 part by weight of 1-3, 2-4-di-benzylidene sorbitol and 0.005 to 1.0 part by weight of talc.

2. The polypropylene resin composition of claim 1 wherein the amount of talc ranges from 5 to 60% by weight of 1-3, 2-4-di-benzylidene sorbitol used.

3. The polypropylene resin composition of claim 1 wherein it comprises 0.02 to 0.5 part by weight of 1.3, 2.4-di-benzylidene sorbitol per 100 parts by eight of the propylene-ethylene random copolymer.

4. The polypropylene resin composition of claim 1 wherein it comprises 0.01 to 0.5 part by weight of talc per 100 parts by weight of the propylene-ethylene random copolymer.

5. The polypropylene resin composition of claim 1 wherein it further comprises at least one member selected from the group consisting of antioxidants, ultraviolet absorbers, pigments, dispersants and neutralizing agents.

* * * * *